US010820020B2

(12) United States Patent
Dunker et al.

(10) Patent No.: US 10,820,020 B2
(45) Date of Patent: Oct. 27, 2020

(54) ADVANCED PREPARATION FOR CONTENT REVISION BASED ON EXPECTED LATENCY IN OBTAINING NEW CONTENT

(71) Applicant: Gracenote, Inc., Emeryville, CA (US)

(72) Inventors: Peter Dunker, Thuringia (DE); Markus K. Cremer, Orinda, CA (US); Shashank C. Merchant, Sunnyvale, CA (US); Kurt R. Thielen, Maple Grove, MN (US)

(73) Assignee: Gracenote, Inc., Emeryville, CA (US)

( * ) Notice: Subject to any disclaimer, the term of this patent is extended or adjusted under 35 U.S.C. 154(b) by 0 days.

(21) Appl. No.: 16/166,962

(22) Filed: Oct. 22, 2018

(65) Prior Publication Data
US 2020/0029107 A1 Jan. 23, 2020

Related U.S. Application Data

(60) Provisional application No. 62/700,647, filed on Jul. 19, 2018.

(51) Int. Cl.
*H04N 21/234* (2011.01)
*H04N 21/485* (2011.01)
(Continued)

(52) U.S. Cl.
CPC ..... *H04N 21/23424* (2013.01); *H04N 21/485* (2013.01); *H04N 21/812* (2013.01);
(Continued)

(58) Field of Classification Search
CPC ............. H04N 21/4076; H04N 21/845; H04N 21/8358; H04N 21/23424; H04N 21/812
See application file for complete search history.

(56) References Cited

U.S. PATENT DOCUMENTS 8,484,676 B1 7/2013 Narsimhan et al.
8,732,745 B2 5/2014 McCoy et al.
(Continued)

OTHER PUBLICATIONS

International Search Report and Written Opinion from International Application No. PCT/US2019/035967, dated Sep. 26, 2019.

*Primary Examiner* — Nasser M Goodarzi
*Assistant Examiner* — Patrick A Ryan
(74) *Attorney, Agent, or Firm* — McDonnell Boehnen Hulbert & Berghoff LLP

(57) ABSTRACT

When a media client is receiving a media stream, the media client determines an upcoming time point at which the media client is to perform a content revision involving insertion (e.g., substitution or overlaying) of new content. The media client further determines an advanced time point when the media client should initiate a process of acquiring the new content, setting the advanced time point sufficiently in advance of the upcoming content-revision time point to enable the media client to obtain at least enough of the new content to be able to start the content revision on time. In an example implementation, the media client could determine the advanced time point by predicting how long the content-acquisition process will take, based on consideration of past instances of content acquisition, possibly correlated with operational factors such as content source, processor load, memory load, network speed, and time of day.

20 Claims, 4 Drawing Sheets

(51) Int. Cl.
*H04N 21/845* (2011.01)
*H04N 21/8358* (2011.01)
*H04N 21/81* (2011.01)
*H04L 29/06* (2006.01)

(52) U.S. Cl.
CPC ....... *H04N 21/8358* (2013.01); *H04N 21/845* (2013.01); *H04L 65/4076* (2013.01)

(56) References Cited

U.S. PATENT DOCUMENTS

| | | | |
|---|---|---|---|
| 2004/0237102 | A1 | 11/2004 | Konig et al. |
| 2007/0061855 | A1* | 3/2007 | Serita ............... H04N 21/23424 725/100 |
| 2009/0300145 | A1 | 12/2009 | Musayev et al. |
| 2011/0022471 | A1* | 1/2011 | Brueck ................. G06Q 30/02 705/14.61 |
| 2013/0166690 | A1* | 6/2013 | Shatzkamer ..... H04N 21/25891 709/219 |
| 2013/0219427 | A1 | 8/2013 | Zundel et al. |
| 2016/0316240 | A1* | 10/2016 | Hirsch ................. H04M 15/57 |
| 2017/0140437 | A1* | 5/2017 | Bhat ................. G06Q 30/0269 |
| 2017/0251039 | A1 | 8/2017 | Hoffert et al. |
| 2018/0035149 | A1 | 2/2018 | Choi et al. |

\* cited by examiner

ADVANCED PREPARATION FOR CONTENT REVISION BASED ON EXPECTED LATENCY IN OBTAINING NEW CONTENT

REFERENCE TO RELATED APPLICATION

This application claims priority to U.S. Provisional Patent Application No. 62/700,647, filed Jul. 19, 2018, the entirety of which is hereby incorporated by reference.

BACKGROUND

A typical media client operates to receive an analog or digital media stream representing media content such as video and/or audio content and to output the media content and/or forward the stream for presentation of the content on a user interface such as a display screen and/or an audio speaker. Examples of such clients include televisions, computer monitors, projection systems, loudspeakers, headphones, set top boxes (e.g. cable or satellite TV receivers), digital video recorders, radios, personal computers, gaming consoles, streaming media players, and the like.

By way of example, the media client could be a television, which could receive a media stream (e.g., an over the air broadcast stream, a media stream output from a set top box, a media stream played from a digital storage medium, an Internet stream, or another such stream) and could present the media content of that stream to a user. As another example, the media client could be a set top box, which could receive a broadcast stream from a multi-channel video program distributor and could output the media content of that stream via a High-Definition Multimedia Interface (HDMI) cable or other interface to a television and/or audio/video receiver for playout. As still another example, the media client could be a digital video or audio recorder, which could likewise receive a broadcast stream but could store the stream for later playout. And as yet another example the media client could be a loudspeaker or headphones, which could receive an audio stream from a radio, computer, or other receiver or audio storage device and could present the audio content of that stream to a user. Numerous other examples are possible as well.

SUMMARY

When a media client is receiving a media stream, it may be useful in certain situations for the client to revise a portion of the stream's media content. For example, it may be useful for the client to dynamically replace an ad or other segment of the media content with a replacement ad or with other replacement content, so that when the content is played out to a user, the user would receive the replacement ad in place of the originally included ad. As another example, it may be useful for the client to dynamically supplement a portion of the media content with overlay or split-screen content, such as channel identification, context information, ad content, or the like, so that when the content is being played out to a user, the user would receive the supplemental content together with the originally included content.

Further, it may be desirable for the client to perform such content revision at a specific time point within the media stream. For instance, if the client is to dynamically replace an existing ad with a replacement ad, it may be desirable for the client to position the replacement ad at a time in the media stream when the existing ad would have started. Likewise, if the client is to supplement a specific portion of the media content with an overlay related to that portion, it may be desirable for the client to start the overlay when that portion starts. Other examples are possible as well.

More particularly, the media stream at issue could define a sequence of frames, such as video frames and/or audio frames, and it may be desirable for the client to perform the content revision on a frame-accurate basis. For instance, for ad replacement, it may be desirable for the client to insert the replacement ad in place of the existing ad starting precisely at the first frame of the existing ad. And for adding an overlay to a specific portion of the media stream, it may be desirable for the client to start the overlay at or in specific relation to the first frame of that portion of the media stream.

To facilitate having the client perform this content revision, the client may need to obtain new content, such as a new stream, that the client should insert (e.g., substitute or overlay) at the desired content-revision time point. In practice, the client could be pre-provisioned or dynamically provisioned with a pointer to the new content, such as an address or other identifier that enables the client to obtain the new content. For instance, the client could be provisioned with a Universal Resource Locator (URL) that defines or correlates with a network address of a streaming media server, file server, or the like, from which the client could request and receive the new content. Alternatively, the client could learn in another way where and/or how the client is to obtain the new content, so that the client can perform the content revision at the indicated time point in the media stream.

Unfortunately, however, a problem that can arise in this process is that it may take some time for the client obtain the new content that the client needs in order to perform the content revision, and this latency could give rise to timing issues in performing the content revision and consequently to user-experience issues.

For instance, if the client will obtain the new content from a streaming media server via a content delivery network such as the Internet, the client may need to first engage in messaging with the streaming media server to establish a real-time media session through which the server would stream the new content to the client, and the client may need to wait some time for the streaming transmission to start and for the client to buffer the incoming new media content, before the client would then be able to start using the new media content to perform the content revision. These and other such steps would delay the client's acquisition of the new content. Further, there could be similar delays if the client will obtain the new content from a file server or in another manner.

To help address this problem, the present disclosure provides that the client will start the process of obtaining of the new content sufficiently far in advance of when the content revision is to start, to help ensure that the client will have enough of the new content to start the content revision on time. Further, the disclosure provides that the client could dynamically determine how far in advance to start this process, with the advanced duration being based on how long it has historically taken the client to acquire new content, possibly in correlation with various operational factors such as content-source, processor load, memory load, network load, network latency, and/or time of day, among other possibilities.

For example, in accordance with the disclosure, the client could determine an upcoming time point in a media stream at which the client is to perform a content revision (e.g., start performing a content revision) that involves substitution or overlaying of new content. Further, the client could determine an advanced time point at which the client should initiate a process of acquiring the new content to facilitate performing the content revision at the upcoming time point. For instance, the client could determine a content-acquisition duration based on past history of content-acquisition durations possibly in correlation with one or more operational parameters, and the client could apply the determined content-acquisition duration, such as by subtracting it from the upcoming time point, to determine the advanced time point. At the advanced time point, the client could then initiate a process of acquiring the new content. And at the upcoming time point, the client could perform the content revision.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

DETAILED DESCRIPTION

Figure 1:
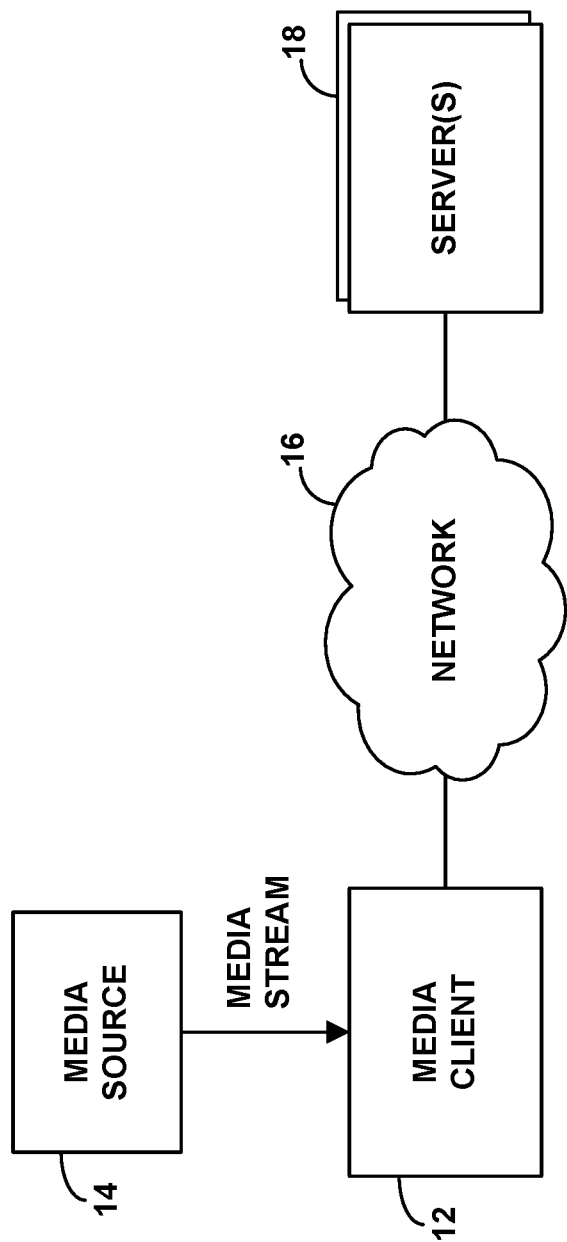
FIG. 1 is a simplified block diagram of system in which disclosed features can be implemented.

Referring to the drawings, FIG. 1 is a simplified block diagram of an example system in which various disclosed principles can be applied. It will be understood, however, that this and other arrangements and processes described herein can take various other forms. For instance, elements and operations can be re-ordered, distributed, replicated, combined, omitted, added, or otherwise modified. Further, it will be understood that operations described herein as being carried out by one or more entities could be implemented by and/or on behalf of those entities, through hardware, firmware, and/or software, such as by one or more processing units executing program instructions or the like.

As shown in FIG. 1, the example system includes a media client 12 configured to receive a media stream in real-time from a media source 14.

The media client 12 could be configured to operate as described above to receive from the media source 14 an analog or digital media stream representing media content such as video and/or audio content and to output the media content and/or forward the stream for presentation of the content on a user interface such as a display screen and/or an audio speaker. The media client could take any of the forms described above, among other possibilities.

The media source 14 could also take various forms, possibly depending on the form of the media client 12. By way of example, if the media client 12 is a television, the media source 14 could be a local set top box (e.g., cable or satellite receiver) or a streaming media server, configured to output a selected media stream for presentation by the television, or the media source 14 could be a broadcast television station or the like, among other possibilities. And if the media client is a computer, the media source may comprise an Internet streaming media server or other media provider. Alternatively, the media source 14 could be data storage integrated with and/or accessible locally by the media client 12, with the media client receiving (e.g., retrieving) the media stream from the data storage for playout, such as when the client is playing out the media stream or is forwarding the media stream for playout. Other examples are possible as well.

As further shown in FIG. 1, media client 12 could have a communication interface with a network (e.g., the Internet or a private network) 16 through which the media client can engage in communication with one or more servers 18. Servers 18 could include file servers, media servers, and/or other types of content servers or the like. Further, although media source 14 is shown separately from servers 18, media source 14 could alternatively be included or integrated with one or more of servers 18 and could be accessible via network 16.

As noted above, when a media client such as client 12 is receiving a media stream, it may be useful for the client to revise a portion of the stream's content, such as to replace or supplement a segment of the stream's content. Further, as noted above, it may be desirable for the client to do so at a specific time point within the media stream. For instance, if the stream defines a sequence of frames, such as video frames and/or audio frames, it may be desirable for the client to perform the revision starting at a specific frame of the sequence.

In practice, the client could learn in various ways the specific time point in the media stream where the client should perform the content revision.

For instance, the client could be provisioned with or receive along or in association with the media stream a set of data that identifies or timestamps each frame within the media stream (e.g., timestamps embedded in the media stream or otherwise provided through in-stream signaling) as well as data that specifies the identity or timestamp of the frame where the content revision is to start. Based on that data, the client could thus determine the specific time point in the media stream where the content revision is to start.

Alternatively, as the client receives the media stream (e.g., as the client plays the media stream), the client could work with a network server to learn the point in the media stream where the content revision is to start. For instance, the server could first identify the media stream being received by the client. And upon identifying the media stream, the server could then determine a specific time point in the media stream where the client should perform the content revision and could inform the client of that determined time point.

To facilitate the server's identification of the media stream being received by the client, the client (or perhaps an adjunct device) could generate digital fingerprint data representing the media content in real time as the client receives the stream, and the server could compare that fingerprint data with reference fingerprint data representing media content of a known media stream, with a fingerprint match indicating that the media stream being received and/or played by the client is the known media stream.

The server could establish or otherwise have access to reference fingerprint data representing the known media stream. For instance, the server or an associated watching station or other entity could receive a broadcast of the known media stream and, while receiving the broadcast, could generate a sequence of reference digital fingerprints representing frames of the known media stream. The server or another entity could establish these reference fingerprints by programmatically analyzing frames of the known media stream, receiving as input a copy of the known media stream and applying any media fingerprinting process or algorithm now known or later developed to generate the reference fingerprints. Or the server could otherwise establish or be provisioned with this sequence of reference fingerprints representing the known media stream. The server could then store the reference fingerprints in association with an identity of the known media stream.

Further, in real time as the client receives a media stream, the client could generate query fingerprints representing frames of that stream and could transmit the query fingerprints to the server for analysis. To facilitate fingerprint comparisons, the client could generate these query fingerprints using the same fingerprinting process or algorithm that is or was applied to establish the reference fingerprints. In addition, the client could generate the query fingerprints at a particular frame rate and could transmit the fingerprints in groups to the server. For instance, for a media stream comprising video at 30 frames per second, the client might generate the query fingerprints at a reduced frame rate on the order of 2 frames per second to help conserve resources, and the client might transmit a latest group of query fingerprints to the server every 1.5 seconds or so. Other examples are possible as well.

As the server receives the query fingerprint data from the client, the server could compare the query fingerprint data with the reference fingerprint data of the known media stream. And if the server thereby determines with sufficient confidence that the query fingerprint data matches the reference fingerprint data, the server could conclude that the media stream being received by the client is the known media stream.

The server could conduct this fingerprint comparison on a per-frame basis. Considering video content, for instance, the server could conduct the analysis on a per-video-frame basis, comparing a query fingerprint of a frame against a reference fingerprint of a frame. The comparison process could take any of a variety of forms, depending on the structure of the fingerprints. For example, the comparison could involve computing a maximum deviation between the fingerprints and determining if the maximum deviation is within a predefined tolerance. Further, if the fingerprints are binary, this could be a Boolean determination or could involve computing a Hamming distance (as a count of mismatches between respective bit locations in the fingerprints). And if the fingerprints are more complex values, such as decimal values or vectors (e.g., grey values per video frame region), this could involve determining a distance between the values or vectors. Numerous other examples are possible as well.

In addition, the server could conduct this fingerprint comparison process with a desired level of tolerance. For instance, the comparison could be coarse, with relatively high tolerance for differences between the fingerprints, such as with tolerance for a greater number of differences and/or tolerance for a greater size of differences. By way of example, when comparing two 32-bit fingerprints with each other, a coarse comparison may deem the fingerprints to match each other generally even if two or another designated number of bits do not match. Or the comparison could be more granular, with lower tolerance for such differences, and/or with comparisons focused on specific fingerprint components possibly representing specific portions of the underlying media.

Through this comparison of the client-generated query fingerprints with the reference fingerprints of the known media stream, the server could thereby find one or more matches. For instance, the server could find one or more instances where a query fingerprint of a frame of the media stream being received by the client matches a respective reference fingerprint of a frame of the known media stream. This matching could thus establish or support a conclusion that the media stream being received by the client is the known media stream.

Alternatively, the server could identify the media stream at issue in other ways. For instance, if the media stream contains watermark data corresponding with an identity of the media stream, the client could read or otherwise extract the watermark data and report the watermark data to the server. And the server could then use the reported watermark data as a basis to identify the media stream being received by the client. For example, the server could consult reference data that correlates various watermark data with particular known media streams, to determine that the watermark data reported by the client corresponds with a particular known media stream.

Having identified the media stream being received by the client, the server could then determine a time point in the media stream where a content revision is to occur. For instance, the server could consult reference data that specifies a time point within the known media stream where a content revision is to start. And the server could then transmit to the client a directive that indicates that time point.

The revision time point specified by the server's reference data could be defined in a manner that is understandable to the client. For instance, if the client is provisioned with data that timestamps each frame of the media stream along a "true time" timeline defined within the media stream, the revision time point that the server has might be the true-time timestamp of an upcoming frame of the media stream. The server could thus provide the client with that true-time timestamp as an indication of the time when the client should perform the content revision.

Further, the client could map that true-time timestamp to "client time" defined according to the client's internal clock so that the client can determine a time on its own clock when it should perform the content revision. For instance, the client could (i) compute a difference between the true-time timestamp of a current frame and the current time on the client's clock and (ii) apply that determined difference to the indicated true-time timestamp of the upcoming frame where the revision is to occur, to determine the client-time point when the client should perform the content revision.

Alternatively, the revision time point specified by the server's reference data might be defined in a manner that is not understandable to the client. For instance, the revision time point that the server has might be a timestamp defined according to a true-time timeline within the known media stream, but the client might have no context or perspective for true time. In that case, the server could engage in a process to establishing a mapping or "synchronous lock" between true time and client time, and the server then map the true-time time point where the content revision is to occur to a corresponding client-time time point and provide that client-time time point to the client.

As an non-limiting example of this, consider a media stream that defines an ad pod that could appear within a television broadcast. An ad pod comprises a sequence of ads, such as television commercials. With this example, the client might be a television that is receiving and presenting a linear broadcast feed of a particular television channel, and the ad pod might appear at any moment within that feed. Especially with a live broadcast such as a sporting event, for instance, the time when the ad pod appears in such a feed may be unpredictable. Alternatively, the ad pod could appear at a specifically scheduled time.

In this example, the desired revision could be replacement of a particular ad within the ad pod (e.g. substituting for the ad a different ad or other replacement content). For instance, if the ad pod is a sequence of ads A1, A2, A3, A4, the desired revision could be replacement of ad A3.

In this situation, the ad pod may define a true-time timeline starting at time T=0 and continuing to the end of the ad pod, and ad A3 may begin at time $T_{A3}$ on that timeline. However, the client may lack context for that timeline. The client may have its own internal clock that has a timeline (e.g., time of day or other internal time reference) defining client time. But without advanced knowledge of where the ad-pod timeline exists within client time, merely given the value $T_{A3}$ as the desired content-revision time point would not enable the client to perform the ad replacement when desired.

For the server to establish synchronous lock between true time and client time in that context, the client could timestamp the query fingerprints that the client sends to the server. In particular, as the client receives the media stream and generates query fingerprints, the client could timestamp each query fingerprint with a current client-time value. When the server detects one or more matches between the query fingerprints and timestamped reference fingerprints of the known media stream, the server could then use those matching points as a basis to map true time to client time. For instance, based on at least one such detected matching point, the server could define a mapping between (i) the true-time timestamp of the matching reference fingerprint and (ii) the client-time time stamp of the matching query fingerprint.

Once the server has established synchronous lock, the server could then use the established synchronous lock to translate the true-time time point where the content revision is to occur into a corresponding client-time time point at which the content revision is to occur. And the server could transmit that determined client-time time point to the client, to enable the client to perform the content revision at the desired time point in the media stream that the client is receiving.

Further, in an alternative implementation, the client rather than the server could carry out the process of establishing and applying synchronous lock in order to determine the client time point where the content revision is to occur.

For instance, once the server has identified the media stream being received by the client, the server could transmit to the client some reference data defining reference fingerprints and true-time timestamps for an upcoming portion of the known media stream. The client could then conduct the fingerprint matching between query fingerprints and reference fingerprints to find one or more matching points, and the client could establish synchronous lock between true time and client time by similarly correlating the timestamps of at least one matching point. Once the client has established the synchronous lock, the client could then use the synchronous lock as a basis to translate a provided true-time time point where the content revision is to occur into a corresponding client-time time point where the content revision is to occur.

In addition to learning the specific time point in the media stream when the client should start the content revision, the client could also learn in various ways what content revision the client should perform starting at that time point.

By way of example, the client could be pre-provisioned in advance with a specification of the content revision to perform at the indicated time point, such as an indication that the client should substitute certain content in place of existing content of the media stream and/or add overlay or other supplemental content to existing content of the media stream. Alternatively, the client could receive from a server or another entity a specification of the content revision to perform. For instance, when a server transmits to the client a directive informing the client of the time point in the media stream when the client is to perform the content revision, the server could include in that directive (or provide separately) to the client a specification of the content revision to perform.

In practice, the specification of the content revision to perform could comprise a pointer to new content that the client is to obtain and is to insert in place of or as a supplement to existing content of the media stream. For example, as noted above, the specification could comprise a Universal Resource Locator (URL) that defines or correlates with a network address of a streaming media server, file server, or the like, from which the client could request and receive the new content. Alternatively, the specification could indicate in another way where and/or how the client is to obtain the new content, to facilitate performing the content revision at the indicated time point in the media stream. Further, the specification could indicate the type of content revision that the client is to apply, such as whether the content revision is a content replacement, overlay, or the like.

At the indicated time point where the content revision is to start, the client could thus start the content revision. For instance, if the content revision involves replacing content of the media stream with the new content, the client could start substituting frames of the new content for frames of the existing media stream. Or if the content revision involves overlaying the new content onto existing content of the media stream, the client could start modifying frames of the media stream to be combinations of the existing content and the new content. Other examples are possible as well.

As a non-limiting example, consider again the ad pod discussed above. In practice, a server could be provisioned with timestamped reference fingerprints representing and corresponding with the frames of the ad pod. Further, the server could be provisioned with an indication that a particular one of the ads in the ad pod should be replaced, and with a reference timestamp (e.g., in true-time) of the frame where that ad replacement should start.

On an ongoing basis as the client receives a linear broadcast feed that may contain this ad pod, or in response to one or more other triggers, the client could be generating timestamped query fingerprints of the broadcast feed and could be reporting those timestamped query fingerprints to the server for analysis. Comparing such query fingerprints with the reference fingerprints representing the frames of the ad pod sequence, the server could thereby detect that the client is receiving the ad pod sequence.

Having determined that the client is receiving the ad pod sequence, the server could then translate the true-time point of the frame where the ad replacement is to start into a corresponding client-time point in the manner discussed above for instance and could transmit to the client a directive that specifies that client-time point, includes a pointer to a replacement ad that the client is to substitute for frames of the media stream starting at that client-time, and directs the client to perform the indicated content replacement. Accordingly, the client could obtain the indicated replacement ad and could substitute that ad for frames of the media stream starting at the indicated client-time point.

As noted above, one problem that can arise in this process is that it may take some time for the client obtain the new content that the client needs in order to perform the content revision, and this latency could give rise to timing issues in performing the content revision and consequently to user-experience issues. For instance, as noted above, if the client will obtain the new content from a streaming media server via a content delivery network such as the Internet, the client may need to first engage in messaging with the streaming media server to establish a real-time media session through which the server would stream the new content to the client, and the client may need to wait some time for the streaming transmission to start and for the client to buffer the incoming new media content, before the client would then be able to start using the new media content to perform the content revision.

Various factors may contribute to this delay. For instance, at times when the client's processor (e.g., central processing unit (CPU)) is especially busy and/or when the client's memory or other data storage is particularly loaded, there may be delay in the client's being able to request and/or receive (e.g., start receiving) the new content. Further, at times when the client's network connection or other interface with a server or other source of the new content is especially loaded or otherwise suffers from slow a data transfer rate, there may be delay in the client's receipt of the new content. Other factors could exist as well.

Unfortunately, as a result of this delay, the client might start the content revision later than desired. For instance, with the ad pod example, if the client has not obtained enough of the replacement ad to be able to start the ad replacement by the first frame of the existing ad, the client might start the ad replacement some number of frames later. As a result, as the ad pod is being played out to a user, the first several frames of the existing ad may be presented, and the presentation may then abruptly switch to be the replacement ad. Further, delayed starting of the replacement ad could create associated issues at the end of the replacement-ad playout, as the client may need to (but may not) end the replacement ad early to avoid having the replacement ad overlap with the start of a next ad or other segment of the existing media stream.

To help address this problem per the present disclosure, as noted above, the client will start the process of obtaining of the new content sufficiently far in advance of when the content revision is to start, to help ensure that the client will have enough of the new content to start the content revision on time. Further, as noted above, the client could dynamically determine how far in advance to start this process, with the advanced duration being based on how long it has historically taken the client to acquire new content, possibly in correlation with operational factors such as content-source, CPU load, memory load, network load, and/or network latency, among other examples.

In an example implementation, the client could monitor how long it typically takes the client to acquire new content. For instance, each time the client obtains new content, the client could determine how much time passes from when the client initiates the content-acquisition process to when the client has obtained enough of the new content to facilitate starting an associated content revision.

Here, the act of initiating the content-acquisition process could take various forms. For example, if the client will receive the content from a streaming media server, the act of initiating the content-acquisition process might be the client sending a Transport Control Protocol (TCP) handshake message to the streaming media server for setup of a TCP socket through which to engage in further communication with the server. Alternatively, the act of initiating the content-acquisition process might be the client sending a Real-Time Streaming Protocol (RTSP) SETUP request or the like to the streaming media server, to request setup of a streaming media session through which the client will receive the new content. Other examples are possible as well.

The client could then statistically roll up these determined content-acquisition durations over recent time, as an average or other measure, to establish a representative content-acquisition duration. Further, the client could continue this evaluation over time, regularly confirming or updating the representative content-acquisition duration.

When faced with a need to perform a content revision at an upcoming time point in a media stream, the client could then schedule (e.g., determine and set) an advanced time point for starting its content-acquisition process. For instance, the client could subtract its latest established content-acquisition duration from the client time point when the content revision is to start, to compute an advanced time point at which the client should start its content-acquisition process. And the client could then set an internal timer for the client to begin the content-acquisition process at that computed advanced time point. The client could then initiate the content-acquisition process at the computed advanced time point.

Further, to help avoid timing issues in the content revision, and given the potential for variation (e.g., jitter) in the actual content-acquisition duration and for errors in the analysis, the client could also add a safety time segment (e.g., a defined constant time segment, such as several seconds or another fixed duration) to its latest established content-acquisition duration. The advanced time point that the client computes could thus be set in advance of the content-revision time point by a sum of the latest established content-acquisition duration and the safety time segment. Alternatively or additionally, to account for the possibility of such variation, the client could intentionally plan to start the content revision several frames later than desired and, for video content, could intentionally add starting black frames and/or a fade-out at the end to help ensure continuity.

In addition, considering that client's actual content-acquisition duration might vary based on operational factors such as content-source, CPU load, memory load, network load, and/or network latency, the client could establish various representative content-acquisition durations based on these or other factors (individually and/or in combination). In turn, when the client is then faced with a need to perform a content revision at an upcoming time point in a media stream, the client could determine (e.g., approximate) the current state of one or more such operational factors and could select a content-acquisition duration that the client has correlated with the determined state, possibly extrapolating between points if appropriate. The client could then compute and apply an advanced time point based on the selected content-acquisition duration.

For example, for each of one or more content sources, such as particular servers, domains, or networks from which the client requests and obtains new content, the client could determine a respective, representative content-acquisition duration. When the client is then faced with a need to perform a content revision at an upcoming time point using new content from a given content source, the client could then compute and apply an advanced time point based on a latest representative content-acquisition duration that the client has established for that content source (e.g., for that very content source and/or for content sources of the same domain, network, or the like).

As another example, for each of various levels of CPU load (e.g., processing cycles per unit time used and/or available) and/or memory load (e.g., extent of memory capacity used or remaining), the client could determine a respective, representative content-acquisition duration. When the client is then faced with a need to perform a content revision at an upcoming time point, the client could then evaluate its level of CPU load and/or memory load, and the client could compute and apply an advanced time point based on a latest representative content-acquisition duration that the client has established for that level of CPU load and/or memory load.

Likewise, for each of various levels of network latency, the client could determine a respective, representative content-acquisition duration. In practice, for instance, the client could estimate network latency through use of an Internet Control Message Protocol (ICMP) ping or other echo-request signaling. Alternatively, the client could estimate network latency based on its query-fingerprint signaling with a fingerprint-identification server, such as by the server measuring transmission delay of query-fingerprint transmissions from the client, and the client receiving reports of those delay measurements from the server. (This would be approximation if the fingerprint-identification server and content server are not identical, but the approximation could be reasonable especially if the servers are collocated.)

Further, the client could determine and record content-acquisition durations in correlation with such network latency measures. Thus, when the client is faced with a need to perform a content revision at an upcoming time point, the client could determine a current or latest level of network latency and could compute and apply an advanced time point based on a latest representative content-acquisition duration that the client has established for that level of network latency.

As a variation or enhancement of this process, the client could also track its representative content-acquisition duration based on time of day (e.g., clock time in any given day, day of week, and/or other calendar or clock basis), to account for the possibility that actual content-acquisition duration may vary over time. For instance, there could be typical busy hours when the client's content-acquisition duration tends to be longer, and light hours when the client's content-acquisition duration tends to be shorter. When the client is then faced with a need to perform a content revision at an upcoming time point, the client could determine the current time of day and could compute and apply an advanced time point based on a latest representative content-acquisition duration that the client has established for that time of day.

Further, in an alternative implementation, the client could be provisioned statically to apply a particular content-acquisition duration to help ensure that the client starts its content-acquisition process early enough. For instance, the manufacturer of the client or of a chipset or other component of the client could specify an advanced duration that the client should apply as a basis to determine when the client should initiate content acquisition to facilitate content revision, and the client could be configured to apply that advanced duration. This duration could vary from device to device and/or from component to component, based on defined capabilities of the device or component for instance. When faced with a need to perform a content revision at an upcoming time point, the client could then could compute and apply an advanced time point based on this specified duration.

Note also that the above processes could apply with respect to real-time analysis of a linear broadcast feed or the like being received by a client (e.g., for present playout and/or storage) and could apply as well with respect to analysis of a media stream being received by the client from data storage or the like (e.g., for present playout or transfer). Other implementations are possible as well.

Figure 2:
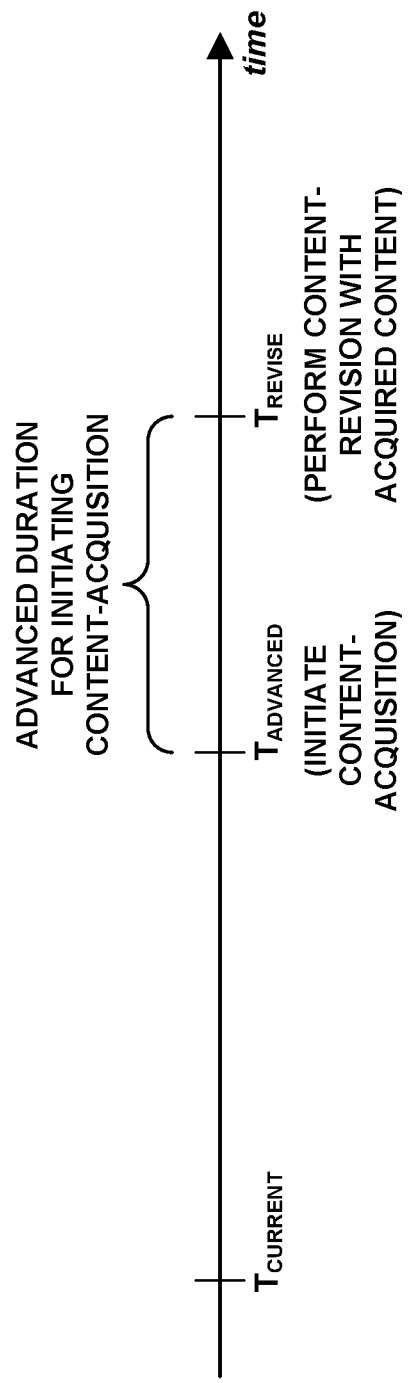
FIG. 2 is a timeline depicting a content-revision time point and an advanced time point for initiating content acquisition.

FIG. 2 is a timeline illustrating the result of operations as discussed above. In particular, FIG. 2 could represent the progression of client time, as a client receives a media stream. As shown in FIG. 2, time point $T_{CURRENT}$ represents a current time, and time point $T_{REVISE}$ represents an upcoming time at which the client is to perform a content revision, e.g., to start substituting or overlaying frames of content. Time point $T_{ADVANCED}$ then represents the time at which the client should initiate content acquisition in an effort to have sufficient content in time to perform the content revision at time $T_{REVISE}$.

In line with the discussion above, at time $T_{CURRENT}$, the client could determine a content-acquisition duration and could set time $T_{ADVANCED}$ as a time point that is at least the content-acquisition duration before time $T_{REVISE}$. The client could then wait until the arrival of computed time $T_{ADVANCED}$ and, responsive to the arrival of time $T_{ADVANCED}$, could initiate acquisition of the new content to help facilitate carrying out the content revision at time $T_{REVISE}$. For instance, at time $T_{ADVANCED}$, the client could start signaling with a streaming media server, to establish a streaming media session through which the client could receive and buffer the new content to facilitate starting the content revision at time $T_{REVISE}$, or the client could take other action to start the content-acquisition process.

Figure 3:
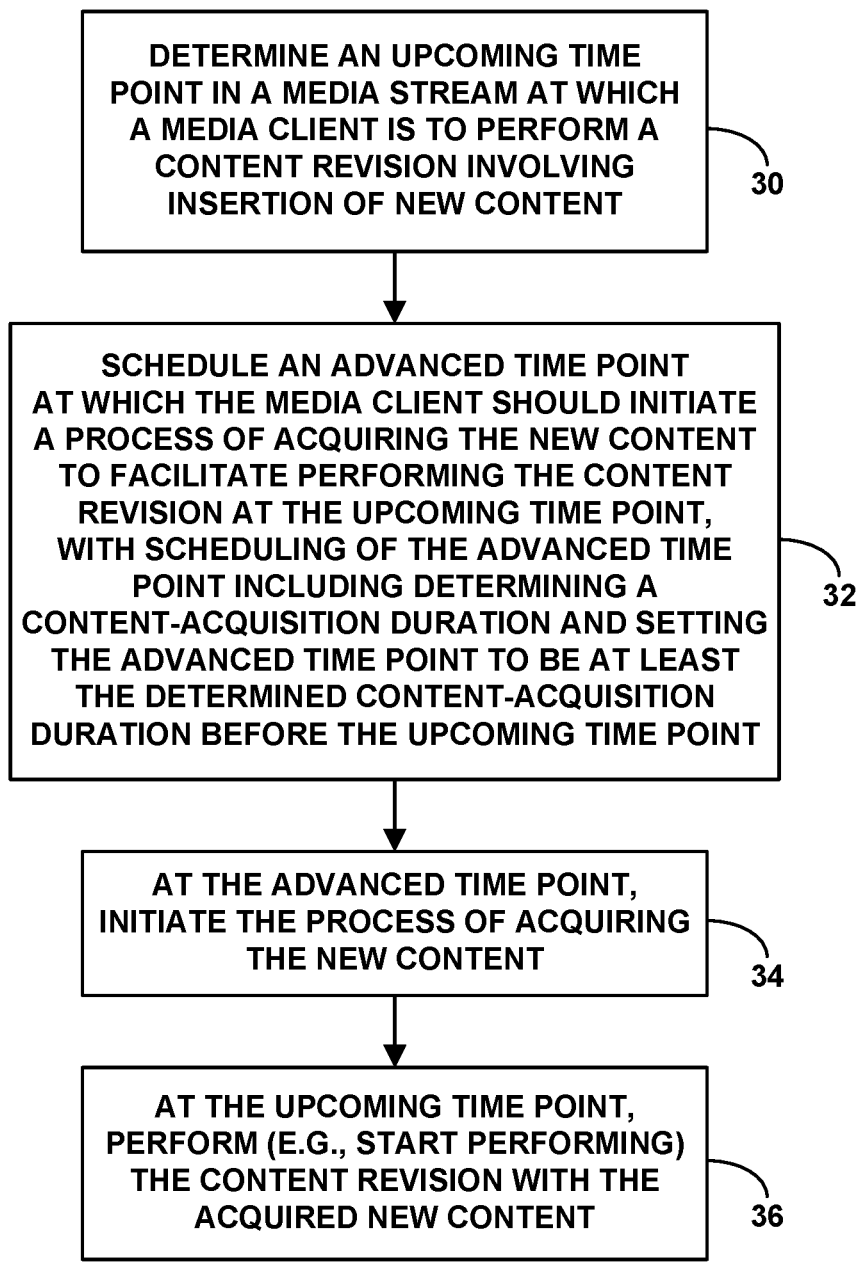
FIG. 3 is a flow chart depicting operations that could be carried out in accordance with the disclosure.

FIG. 3 is a flow chart depicting a method that could be carried out by a computing system, such as a media client, in line with the discussion above. As discussed above, the method could be carried out while the media client is receiving a media stream in a linear broadcast feed or from storage, perhaps while the media client is playing out the media stream or forwarding the media stream for playout or the like. As discussed above, the method could help facilitate timely content revision, such as ad replacement.

As shown in FIG. 3, at block 30, the method includes determining an upcoming time point in a media stream at which a media client is to perform a content revision involving insertion (e.g., substituting or overlaying) of new content. Further, at block 32, the method includes scheduling an advanced time point at which the media client should initiate a process of acquiring the new content to facilitate performing the content revision at the upcoming time point, with scheduling the advanced time point including determining a content-acquisition duration and setting the advanced time point to be at least the determined content-acquisition duration before the upcoming time point. At block 34, the method then includes, at the advanced time point, the media client initiating the process of acquiring the new content. And at block 36, the method includes, at the upcoming time point, the media client performing the content revision with the acquired new content.

As discussed above, the act of determining the content-acquisition duration could involve predicting the content-acquisition duration based on past instances of content-acquisition duration. For instance, method could further involve tracking content-acquisition durations over time to help facilitate predicting the content-acquisition duration, possibly maintaining rolled-up statistics such as averages or the like.

Further, as discussed above, the act of predicting the content-acquisition duration based on past instances of content-acquisition duration could involve determining state of at least one operational factor related to acquiring the new content, and predicting the content-acquisition duration based on past instances of content-acquisition duration in correlation with the determined state. For instance, the at least one operational factor could include one or more of content-source, processor load, memory load, network load, network speed, and time of day. Thus, the media client could determine a current state of one or more such operational factors and could then predict the content-acquisition duration as a statistical measure based on past instances of content-acquisition duration when the one or more operational factors had the same or similar state.

In addition, as discussed above, the act of determining the content-acquisition duration could also involve adding a safety time segment to the predicted content-acquisition duration, and planning to start the content-acquisition process in advance of the upcoming content-revision time point by at least the sum of the determined content-acquisition duration and the safety time segment.

Alternatively, as discussed above, the content-acquisition duration could be defined statically. For instance, the media client could be set to apply a particular content-acquisition duration in order to compute the advanced time point when the client should start its content-acquisition process to facilitate starting the content revision on time.

Figure 4:
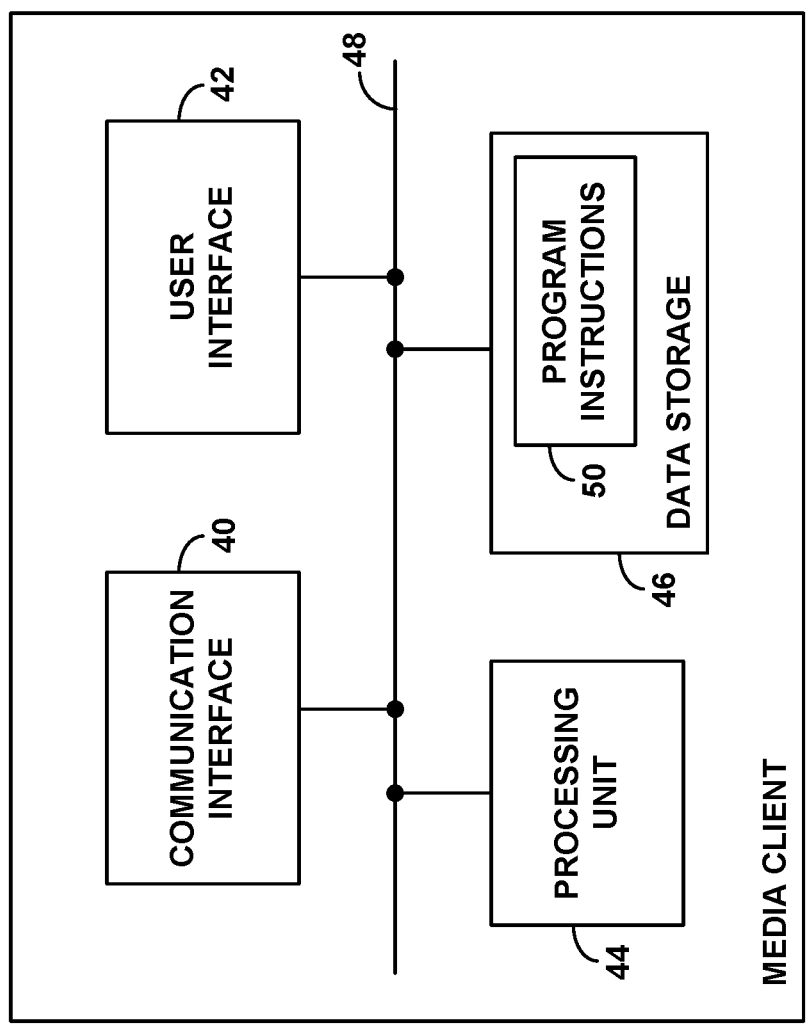
FIG. 4 is a simplified block diagram depicting components of a media client operable in accordance with the disclosure.

FIG. 4 is next a block diagram of an example media client operable to carry out various operations described above. As shown in FIG. 4, the media client includes a communication interface 40, a user interface 42, a processing unit 44, and non-transitory data storage 46, all of which could be coupled or communicatively linked together through a network, message bus, and/or one or more other connection mechanisms 48.

Communication interface 40 could include a media input interface, such as an HDMI interface or the like, along with associated circuitry and software, configured to receive a media stream from an external media source. Further, communication interface 40 could include a network communication interface, such as a wired and/or wireless Ethernet interface along with associated circuitry and software, configured to facilitate communication over a network such as network 16.

User interface 42 could comprise a media presentation interface through which to play out content of a media stream. For instance, if the media client is a television, the user interface 42 could comprise a display screen and sound speaker through which to play video and audio content of a linear feed received from a broadcast station, a streaming media device, or a set top box. Other examples are possible as well.

Processing unit 44 could then comprise one or more general purpose processors (e.g., microprocessors) and/or one or more specialized processors (e.g., application-specific integrated circuits or the like). And non-transitory data storage 46 could comprise one or more volatile and/or non-volatile storage components, such as magnetic, optical, or flash storage. Further, non-transitory data storage 46 could comprise memory, such as random access memory or the like and could be integrated in whole or in part with processing unit 44.

As shown in FIG. 4, the non-transitory data storage 46 stores (e.g., holds, is encoded with, or otherwise embodies or contains) program instructions 50 that are executable by the processing unit to cause the computing system to carry out operations such as those described above.

By way of example, these operations could include determining an upcoming time point in a media stream at which the media client is to perform a content revision involving insertion (e.g., substitution or overlaying) of new content. Further, the operations could include setting an advanced time point at which the media client should initiate a process of acquiring the new content to facilitate performing the content revision at the upcoming time point, with setting of the advanced time point including determining a content-acquisition duration and setting the advanced time point to be at least the determined content-acquisition duration before the upcoming time point. The operations could then include, at the advanced time point (e.g., in response to arrival of the advanced time point), initiating the process of acquiring the new content. And the operations could include, at the upcoming time point (e.g., in response to arrival of the upcoming time point), performing the content revision with the acquired new content.

As discussed above, the media client could predict the content-acquisition duration based on past instances of content-acquisition duration in correlation with one or more operational factors. One such operational factor could be load of media client's processing unit, which the media client could determine based on how long a queue is for processor tasks to be executed, how often the processor is not idle, and/or how long it has taken the processor to perform certain tasks, among other possibilities. Another such operational factor could be load of the media client's memory, which the media client could determine as percentage of its random access memory occupied per unit time or the like. Further, another operational factor could be network speed, which the media client could determine by running standard network speed tests and/or as based on signaling delay as discussed above. Other examples are possible as well.

Various features described above could be implemented in the context of this media client, and vice versa. Further, various operations described above could be defined by program instructions stored on a non-transitory computer readable medium, the program instructions being executable by a processing unit to carry out the operations. Such a non-transitory computer readable medium could then be provided, integrated, or otherwise implemented at the media client and/or another entity. Further, the operations could take other forms.

Exemplary embodiments have been described above. Those skilled in the art will understand, however, that changes and modifications may be made to these embodiments without departing from the true scope and spirit of the invention.

What is claimed is:
1. A method comprising:
  determining an upcoming time point in a media stream at which a media client is to perform a content revision involving insertion of new content;
  scheduling an advanced time point at which the media client should initiate a process of acquiring the new content to facilitate performing the content revision at the upcoming time point, wherein scheduling the advanced time point comprises determining a content-acquisition duration and setting the advanced time point to be at least the determined content-acquisition duration before the upcoming time point;

at the advanced time point, initiating by the media client the process of acquiring the new content; and at the upcoming time point, performing by the media client the content revision with the acquired new content.

2. The method of claim 1, wherein determining the content-acquisition duration comprises predicting the content-acquisition duration based on past instances of content-acquisition duration.

3. The method of claim 2, further comprising tracking content-acquisition durations to facilitate the predicting.

4. The method of claim 2, wherein predicting the content-acquisition duration based on past instances of content-acquisition duration comprises:

determining state of at least one operational factor related to acquiring the new content;

predicting the content-acquisition duration based on past instances of content-acquisition duration in correlation with the determined state.

5. The method of claim 4, wherein the at least one operational factor comprises at least one factor selected from the group consisting of content source, processor load, memory load, network speed, and time of day.

6. The method of claim 2, wherein determining the content-acquisition duration further comprises adding a safety time segment to the predicted content-acquisition duration.

7. The method of claim 1, wherein the content-acquisition duration is defined statically.

8. The method of claim 1, carried out while the media client is receiving the media stream in a linear broadcast feed.

9. The method of claim 8, wherein the content revision comprises ad replacement.

10. The method of claim 1, carried out while the media client is playing out the media stream.

11. A media client comprising:

a processing unit;

non-transitory data storage; and program instructions stored in the non-transitory data storage and executable by the processing unit to cause the media client to carry out operations including:

determining an upcoming time point in a media stream at which the media client is to perform a content revision involving insertion of new content, setting an advanced time point at which the media client should initiate a process of acquiring the new content to facilitate performing the content revision at the upcoming time point, wherein setting the advanced time point comprises determining a content-acquisition duration and setting the advanced time point to be at least the determined content-acquisition duration before the upcoming time point, at the advanced time point, initiating the process of acquiring the new content, and at the upcoming time point, performing the content revision with the acquired new content.

12. The media client of claim 11, wherein determining the content-acquisition duration comprises predicting the content-acquisition duration based on past instances of content-acquisition duration.

13. The media client of claim 12, wherein the operations further comprise tracking content-acquisition durations to facilitate the predicting.

14. The media client of claim 12, wherein predicting the content-acquisition duration based on past instances of content-acquisition duration comprises:

determining state of at least one operational factor related to acquiring the new content;

predicting the content-acquisition duration based on past instances of content-acquisition duration in correlation with the determined state.

15. The media client of claim 14, wherein the at least one operational factor comprises at least one factor selected from the group consisting of content source, processor load, memory load, network speed, and time of day.

16. The media client of claim 12, wherein determining the content-acquisition duration further comprises adding a safety time segment to the predicted content-acquisition duration.

17. The media client of claim 11, wherein the content-acquisition duration is defined statically.

18. The media client of claim 11, wherein the operations are carried out while the media client is receiving the media stream.

19. The media client of claim 11, wherein the content revision comprises ad replacement.

20. A non-transitory computer readable medium storing instructions executable by a processing unit to carry out operations comprising:

determining an upcoming time point in a media stream being received by a client at which the client is to perform a content revision involving insertion of new content;

setting an advanced time point at which the client should initiate a process of acquiring the new content to facilitate performing the content revision at the upcoming time point in the media stream, wherein setting the advanced time point comprises determining a content-acquisition duration and setting the advanced time point to be at least the determined content-acquisition duration before the upcoming time point;

at the advanced time point, causing the client to initiate the process of acquiring the new content; and at the upcoming time point, causing the client to perform the content revision with the acquired new content.

\* \* \* \* \*